(12) United States Patent
McKenney (10) Patent No.: US 8,972,801 B2
(45) Date of Patent: Mar. 3, 2015

(54) MOTIVATING LAZY RCU CALLBACKS UNDER OUT-OF-MEMORY CONDITIONS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/758,778

(22) Filed: Feb. 4, 2013

(65) Prior Publication Data

US 2014/0223242 A1 Aug. 7, 2014

(51) Int. Cl.
*G06F 11/00* (2006.01)
*G06F 3/06* (2006.01)

(52) U.S. Cl.
CPC .................... *G06F 3/0614* (2013.01)
USPC .......................................................... 714/54

(58) Field of Classification Search
CPC ........ G09F 9/52; G09F 9/526; G09F 11/0751
USPC .......................................................... 714/54
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,000,234 B1 * | 2/2006 | Shavit et al. | 719/315 |
| 7,117,502 B1 * | 10/2006 | Harris | 719/315 |
| 7,191,272 B2 | 3/2007 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,653,791 B2 | 1/2010 | McKenney | |
| 7,668,851 B2 | 2/2010 | Triplett | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |

(Continued)

OTHER PUBLICATIONS

P. Zijlstra, "[PATCH] slab: document SLAB_DESTROY_BY_RCU", LKML.org, Nov. 13, 2008, 1 page.

(Continued)

*Primary Examiner* — Scott Baderman
*Assistant Examiner* — Joseph Kudirka
(74) *Attorney, Agent, or Firm* — Walter W. Duft (57) ABSTRACT

A technique for motivating lazy RCU callbacks under out-of-memory conditions. In response to detecting an actual or potential OOM condition, non-lazy callback processing is performed for all processors whose RCU callback lists are non-empty due to at least one callback permitting lazy callback processing being present.

21 Claims, 5 Drawing Sheets

(56) References Cited

U.S. PATENT DOCUMENTS

| | | | |
|---|---|---|---|
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney |
| 8,195,893 | B2 | 6/2012 | Triplett |
| 8,307,173 | B2 | 11/2012 | McKenney |
| 2006/0112121 | A1 | 5/2006 | McKenney et al. |
| 2006/0265373 | A1 | 11/2006 | McKenney et al. |
| 2008/0082532 | A1 | 4/2008 | McKenney |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0320030 | A1 | 12/2009 | Ogasawara |
| 2011/0283082 | A1 | 11/2011 | McKenney et al. |
| 2012/0047140 | A1 | 2/2012 | McKenney et al. |
| 2012/0079301 | A1 | 3/2012 | McKenney |

OTHER PUBLICATIONS

A. Arcangeli et al., "Using Read-Copy-Update Techniques for System V IPC in the Linux 2.5 Kernel," 2003 FREENIX, Jun. 14, 2003, 13 pages.

P. McKenney, "The RCU API, 2010 Edition", LWN.net, Dec. 8, 2010, 11 pages.

M. Desnoyers et al., "User-Level Implementations of Read-Copy Update", IEEE Transactions on Parallel and Distributed Systems, vol. x, No. y, Jul. 2009, pp. 1-14.

J. Triplett, "Scalable Concurrent Hash Tables via Relativistic Programming", ACM-SIGOPS Operating System Review vol. 44, Issue 3, Jul. 2010, 14 pages.

T. Gleixner, High Resolution Timers / Dynamic Tics—V2, LWN.net, Oct. 31, 2006, 5 pages.

D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.

IP.COM et al.; "Avoiding Unnecessary Wakeups When Waking Up CPUs at the Completion of a Grace Period", IPCOM000216206D, Mar. 25, 2012.

Hornbeck et al.; "Power Management in the Linux Kernel", Apr. 7, 2011, pp. 1-31.

McKenney, "Getting RCU Further Out of the Way", 2012 Linux Plumbers Conference, Real Time Microconference, Aug. 31, 2012, 31 pages.

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al, "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 32 pages.

H. Lindar et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

P. McKenney, "Sleepable RCU", LWN.net, Oct. 9, 2006, 10 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al., "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2005, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney, "Is Parallel Programming Hard, and, If So, What Can You Do About It", Mar. 8, 2009, 146 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenny, "Simplicity Through Optimization", linux.conf.au, Jan. 2010, 109 pages.

(56) References Cited

OTHER PUBLICATIONS

P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenny, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.
McKenney, "RCU and Unloadable Modules", LWN.net, Jan. 14, 2007, 4 pages.

* cited by examiner

MOTIVATING LAZY RCU CALLBACKS UNDER OUT-OF-MEMORY CONDITIONS

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a computing environment wherein lazy RCU callbacks can hasten the onset of an out-of-memory condition.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

Figure 1A:
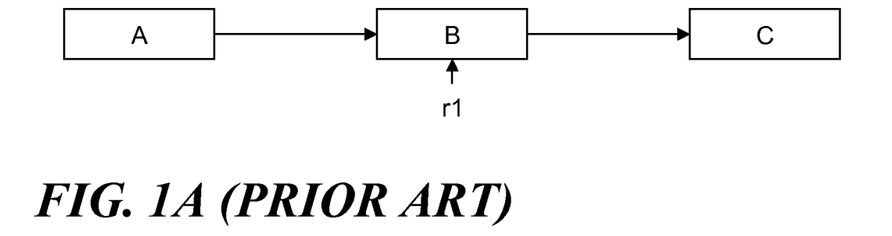
FIGS. 1A-1D are diagrammatic representations of a linked list of data elements undergoing a data element replacement according to a conventional read-copy update mechanism.
Figure 1B:
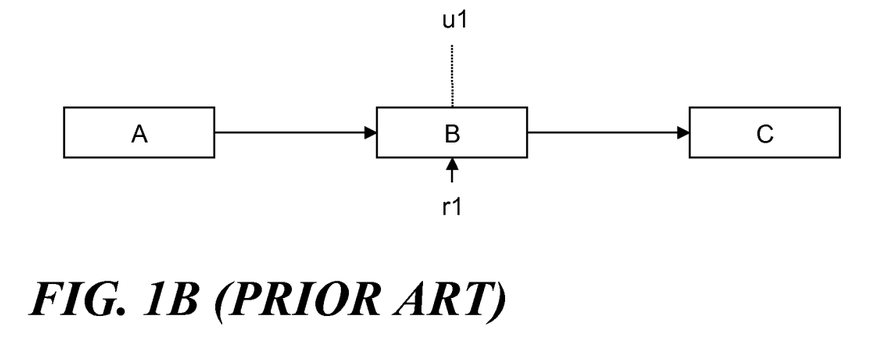
Figure 1C:
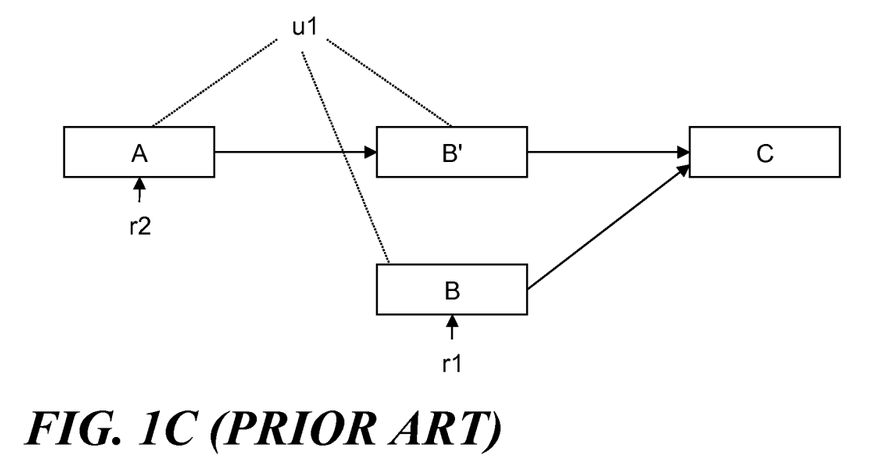

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

Figure 1D:
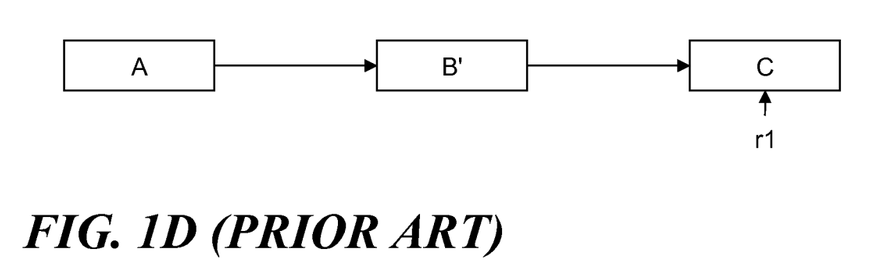

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

Figure 2A:
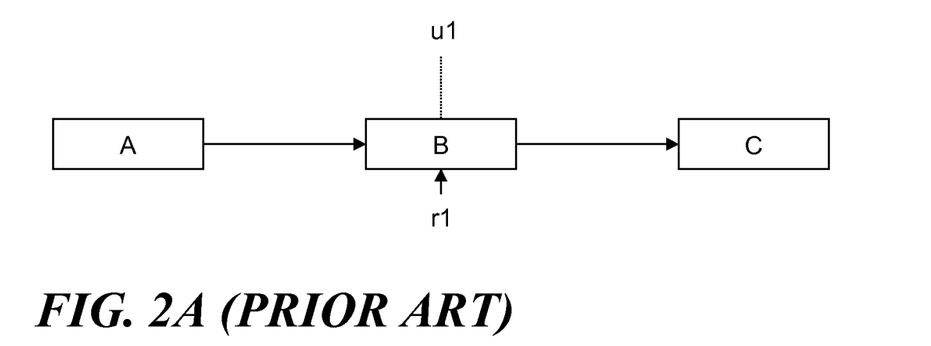
FIGS. 2A-2C are diagrammatic representations of a linked list of data elements undergoing a data element deletion according to a conventional read-copy update mechanism.
Figure 2B:
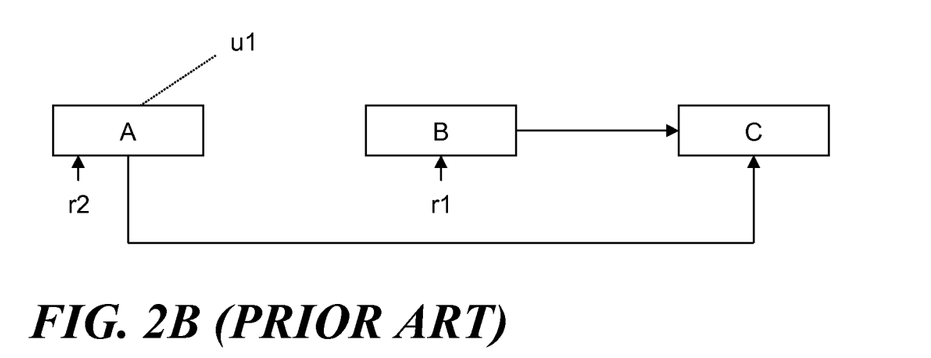
Figure 2C:
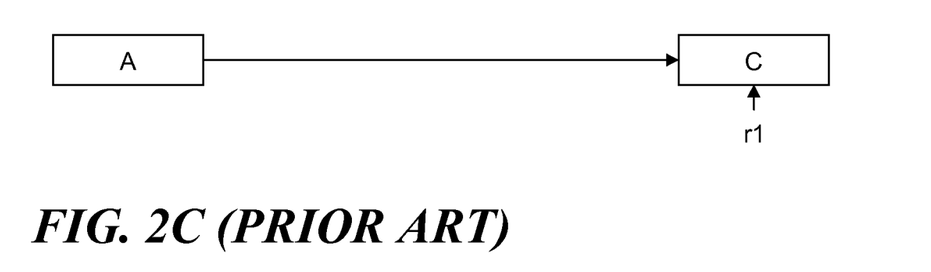

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch. In preemptible operating system kernels, additional steps are needed to account for readers that were preempted within their RCU read-side critical sections. In current RCU implementations designed for the Linux® kernel, a blocked reader task list is maintained to track such readers. A grace period will only end when the blocked task list indicates that is safe to do so because all blocked readers associated with the grace period have exited their RCU read-side critical sections. Other techniques for tracking blocked readers may also be used, but tend to require more read-side overhead than the current blocked task list method.

Figure 3:
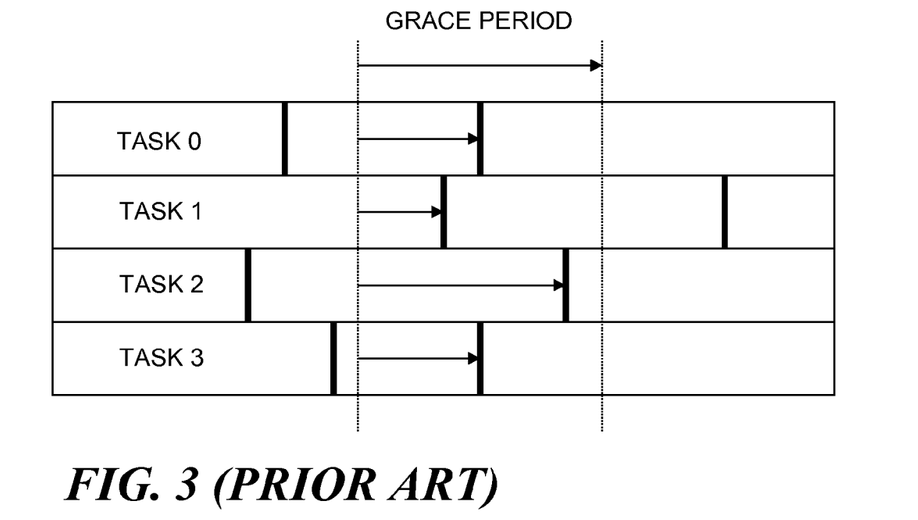
FIG. 3 is a flow diagram illustrating a grace period in which four processes pass through a quiescent state.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, invokes an RCU primitive such as synchronize_rcu( ) to advise when all current RCU readers have completed their RCU critical sections and the grace period has ended, blocks (waits) until the grace period has completed, and then implements the second phase update operation, such as by removing stale data. According to the asynchronous technique, an updater performs the first phase update operation, specifies the second phase update operation as a callback using an RCU primitive such as call_rcu( ) then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows the grace period overhead to be amortized over plural deferred update operations.

Energy-efficiency enhancements to RCU permit CPUs to enter dyntick-idle low-power states despite having RCU callbacks queued. One technique that helps CPUs to remain in these dyntick-idle low-power states for longer periods of time is the classification of RCU callbacks into "lazy" and "non-lazy" categories. Callbacks in the "lazy" category may be delayed for long periods of time, for example in the Linux kernel, for up to six seconds. Although this approach can be quite effective at conserving energy (due to avoiding unnecessary CPU wakeups), it has the disadvantage of increasing memory consumption, which can result in memory exhaustion and in turn to system hangs. The present disclosure presents a technique for improving this situation.

SUMMARY

A method, system and computer program product are provided for motivating lazy RCU callbacks under out-of-memory conditions. In response to detecting an actual or potential OOM condition, non-lazy callback processing is performed for all processors whose RCU callback lists are non-empty due to at least one callback permitting lazy callback processing being present.

In an embodiment, the detecting operation may include detecting an actual OOM condition based on an operating system notification. Alternatively, the detecting operation may include detecting a potential OOM condition based on a backlog of pending callbacks.

In an embodiment, the at least one callback permitting lazy callback processing may be either any callback or any lazy callback.

In an embodiment, the performing operation may include enqueuing a non-lazy callback on each RCU callback list having at least one callback permitting lazy callback processing. Alternatively, the performing operation may include setting a non-lazy mode wherein all pending callbacks are treated as non-lazy. The performing operation may further include processing the RCU callback lists until either each affected callback list is emptied, or is reduced to a predetermined size.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 4:
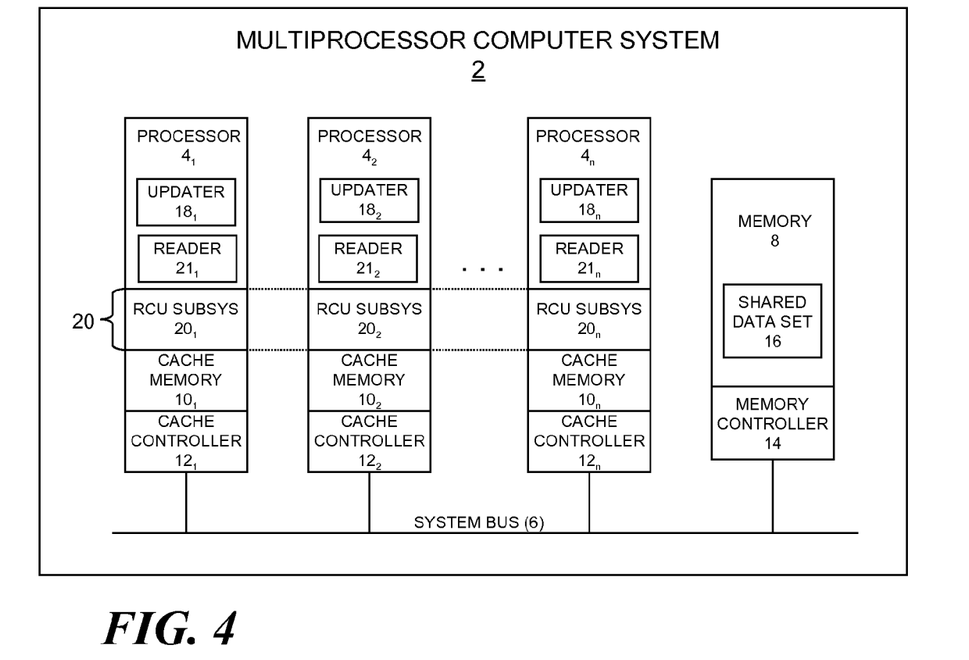
FIG. 4 is a functional block diagram showing a multiprocessor computer system that may be implemented in accordance with the present disclosure.

Turning now to the figures, wherein like reference numerals represent like elements in all of the several views, FIG. 4 illustrates an example multiprocessor computer system 2 that may be used to implement the technique disclosed herein. A uniprocessor computer system could also be used. The computer system 2 includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

The computer system 2 may represent any of several different types of computing apparatus. Such apparatus may include, but are not limited to, general purpose computers, special purpose computers, portable computing devices, communication and/or media player devices, set-top devices, embedded systems, to name but a few. The processors $4_1, 4_2 \ldots 4_n$ may each be a single-core CPU device. Alternatively, the processors $4_1, 4_2 \ldots 4_n$ could represent individual cores within a multi-core CPU device. Each CPU device embodied by any given processor 4 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. The processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

An update operation (updater) 18 may periodically execute within a process, thread, or other execution context (hereinafter "task") on any processor 4. Each updater 18 runs from program instructions stored in the memory 8 (or elsewhere) in order to periodically perform updates on a set of shared data 16 that may be stored in the shared memory 8 (or elsewhere). In FIG. 4, reference numerals $18_1, 18_2 \ldots 18_n$ illustrate individual data updaters that may periodically execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 are programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may periodically execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element. Embodiments of the updaters 18 and the readers 21 may be preemptible, and embodiments of the system 2 may, for example, support real-time operations.

During run time, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing.

The RCU subsystem 20 may handle both asynchronous and synchronous grace periods. Each type of grace period processing entails starting new grace periods and detecting the end of old grace periods so that the RCU subsystem 20 knows when it is safe to free stale data (or take other actions). Asynchronous grace period processing further entails the management of callback lists that accumulate callbacks until they are ripe for batch processing at the end of a given grace period. Grace period processing operations may be performed by periodically running the RCU subsystem 20 on each of the several processors $4_1, 4_2 \ldots 4_n$ in FIG. 4. As is known, different aspects of such processing may be variously invoked by an operating system scheduler and an scheduling clock interrupt handler, and run in a combination of process context and bottom half context or kernel thread context.

Figure 5:
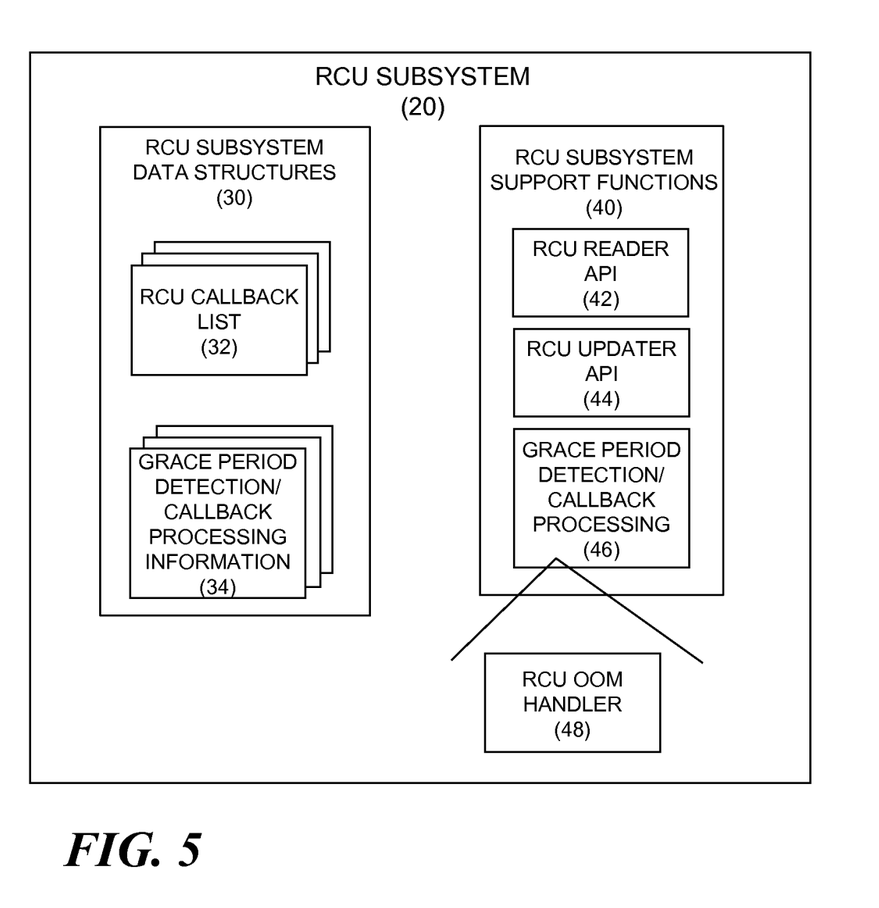
FIG. 5 is a functional block diagram showing an example RCU subsystem that may be provided in the computer system of FIG. 4.

FIG. 5 illustrates example components of the RCU subsystem 20. Among these components are several RCU subsystem data structures 30, including one or more RCU callback lists 32 and one or more data structures comprising grace period detection and callback processing information 34. The RCU callback lists 32 are provided on a per-processor basis. As is conventionally known, each callback list accumulates RCU callbacks for batch processing at the end of grace periods, with each list typically comprising several list portions that respectively accumulate callbacks for a given grace period. The grace period/callback processing information 34 may also be provided on a per-processor basis, and is used to track grace periods and quiescent states, and to manipulate the callback lists 32. With continuing reference to FIG. 5, additional example components of the RCU subsystem 20 include several RCU subsystem support functions 40, namely, an RCU reader API (Application Programming Interface) 42, an RCU updater API 44, and various grace period detection and callback processing functions 46, including an RCU OOM (out-of-memory) handler 48, as described in more detail below.

As stated in the Background section above, energy-efficiency enhancements to RCU permit CPUs to enter dyntick-idle low-power states despite having RCU callbacks queued. One technique that helps CPUs to remain in these dyntick-idle low-power states for longer periods of time is the classification of RCU callbacks into "lazy" and "non-lazy" categories. Callbacks in the "lazy" category may be delayed for long periods of time, for example in the Linux® kernel, for up to six seconds. Techniques that have been previously used in the Linux® kernel to implement lazy callbacks include having the callbacks simply invoke a specialized RCU memory deallocation function called "kfree_rcu( )" which is defined in the source code file "include/linux/rcupdate.h of recent Linux® versions (e.g., version 3.7.1). Other lazy callback invocation techniques may also be used, and it should be noted that the present disclosure is not limited to the Linux® kfree_rcu( ) technique. Although the use of lazy callbacks can be quite effective at conserving energy (due to avoiding unnecessary CPU wakeups), it has the disadvantage of increasing memory consumption, which can result in memory exhaustion and, in turn, to system hangs.

Figure 6:
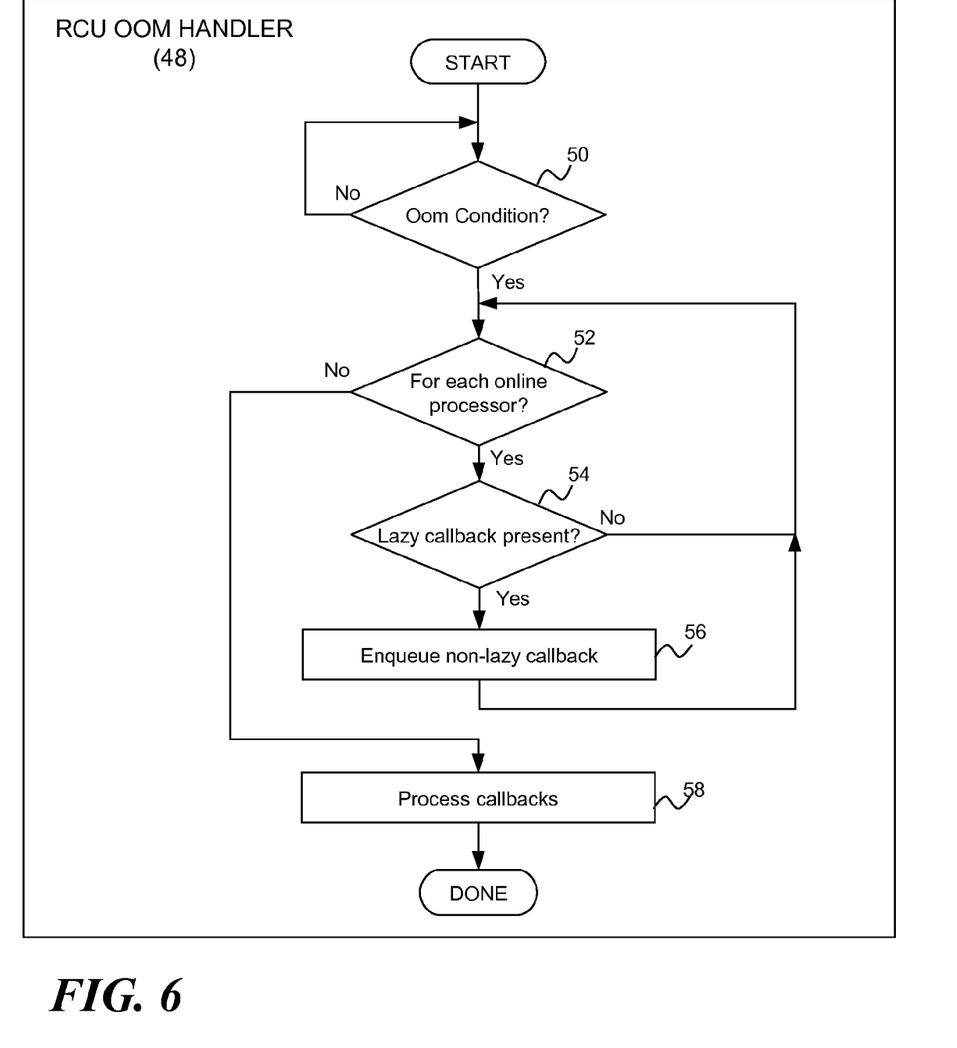
FIG. 6 is a flow diagram showing example operations that may be performed by the RCU subsystem of FIG. 5.

The present disclosure sets forth a technique for motivating lazy RCU callbacks under out-of-memory conditions. Example operations are depicted in FIG. 6, which illustrates an RCU OOM (out-of-memory) handler 48 that may be implemented as part of the grace period detection and callback processing functions 46 of FIG. 5. These operations are triggered in block 50 in response to an actual or potential out-of-memory condition being detected. For example, block 50 could be implemented to respond to an operating system kernel OOM notifier, such as can be found in current versions of the Linux® operating system kernel. The OOM notifier would indicate an actual OOM condition. Alternatively, a potential OOM condition could be detected, such as by detecting lengthy callback lists that have accumulated many callbacks, such that there is a backlog of pending callbacks in excess of some predetermined number. The length of a callback list could be checked at suitable intervals, such as each time a new callback is enqueued. Callback processing would be invoked when the callback count threshold is reached. Other possible triggers include the total number of callbacks in the system, the age of the oldest callback on a given CPU's callback list, the age of the oldest callback in the system, and so on.

If an actual or potential OOM condition is detected in block 50 of FIG. 6, block 52 starts a loop that implements blocks 54 and 56 for each online processor. Within this loop, blocks 54 and 56 cause a non-lazy callback to be enqueued at the end of each processor's callback list that has at least one callback. In an optimal implementation, block 54 would check for at least one lazy callback, and would not enqueue a non-lazy callback unless a lazy callback was found. However, a simple alternative implementation of blocks 54 and 56 could enqueue a non-lazy callback on each callback list that has at least one callback (whether lazy or not). This alternative implementation could utilize the existing rcu_barrier( ) primitive found in current versions of the Linux® kernel, which is used to force callback processing by loadable kernel modules prior to unloading. In a further alternative implementation, block 56 could be modified so that, instead of enqueuing non-lazy callbacks, a non-lazy mode would be implemented that causes the RCU subsystem 20 to treat all pending callbacks as non-lazy. The result of using any of the foregoing alternatives for blocks 54 and 56 is that non-lazy callback processing will be performed in a timely fashion in block 58 for all online processors that can benefit from such processing. If desired, the callback processing of block 58 may be explicitly initiated, such following the last enqueuing operation of performed by block 56. Block 58 may be implemented so that each affected callback list is emptied, or alternatively, is reduced to a predetermined size. In this way, all callbacks that could contribute to an actual or potential OOM condition will be processed, allowing the associated memory to be freed.

Accordingly, a technique for motivating lazy RCU callbacks under out-of-memory conditions has been disclosed. It will be appreciated that the foregoing concepts may be variously embodied in any of a data processing system, a machine implemented method, and a computer program product in which programming logic is provided by one or more machine-usable storage media for use in controlling a data processing system to perform the required functions. Example embodiments of a data processing system and machine implemented method were previously described in connection with FIGS. 4-6. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 7:
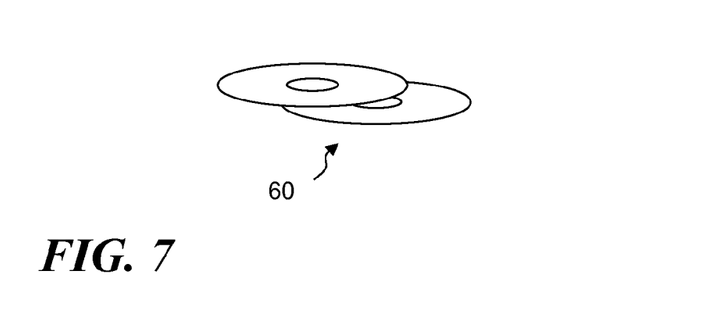
FIG. 7 is a diagrammatic illustration showing example media that may be used to provide a computer program product in accordance with the present disclosure.

Example data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of media that may be used to store the program instructions is shown by reference numeral 100 in FIG. 7. The media 60 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 8 and the cache 10 of FIG. 4, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computing system having one or more processors operatively coupled to one or more memory devices, a method for motivating lazy read-copy update (RCU) callbacks under out-of-memory (OOM) conditions, the method comprising:
   detecting an actual or potential OOM condition; and
   performing non-lazy callback processing for all processors whose RCU callback lists are non-empty due to at least one callback permitting lazy callback processing being present.

2. A method in accordance with claim 1, wherein said detecting comprises detecting an actual OOM condition based on an operating system notification.

3. A method in accordance with claim 1, wherein said detecting comprises detecting a potential OOM condition based on a backlog of pending callbacks.

4. A method in accordance with claim 1, wherein said at least one callback permitting lazy callback processing comprises either any callback or any lazy callback.

5. A method in accordance with claim 1, wherein said performing comprises enqueuing a non-lazy callback on each RCU callback list having said at least one callback permitting lazy callback processing.

6. A method in accordance with claim 1, wherein said performing comprises setting a non-lazy mode wherein all pending callbacks are treated as non-lazy.

7. A method in accordance with claim 6, wherein said performing comprises processing said RCU callback lists until either each affected callback list is emptied or is reduced to a predetermined size.

8. A system, comprising:
   one or more processors; and
   a memory coupled to said one or more processors, said memory including a computer useable medium tangibly embodying at least one program of instructions executable by said processor to perform operations for motivating lazy read-copy update (RCU) callbacks under out-of-memory (OOM) conditions, said operations comprising:

detecting an actual or potential OOM condition; and performing non-lazy callback processing for all processors whose RCU callback lists are non-empty due to at least one callback permitting lazy callback processing being present.

9. A system in accordance with claim 8, wherein said detecting comprises detecting an actual OOM condition based on an operating system notification.

10. A system in accordance with claim 8, wherein said detecting comprises detecting a potential OOM condition based on a backlog of pending callbacks.

11. A system in accordance with claim 8, wherein said at least one callback permitting lazy callback processing comprises either any callback or any lazy callback.

12. A system in accordance with claim 8, wherein said performing comprises enqueuing a non-lazy callback on each RCU callback list having said at least one callback permitting lazy callback processing.

13. A system in accordance with claim 8, wherein said performing comprises setting a non-lazy mode wherein all pending callbacks are treated as non-lazy.

14. A system in accordance with claim 13, wherein said performing comprises processing said RCU callback lists until either each affected callback list is emptied or is reduced to a predetermined size.

15. A computer program product, comprising:

one or more non-transitory machine-useable storage media; and program instructions provided by said one or more media for programming a data processing platform to perform operations for motivating lazy read-copy update (RCU) callbacks under out-of-memory (OOM) conditions, said operations comprising:

detecting an actual or potential OOM condition; and performing non-lazy callback processing for all processors whose RCU callback lists are non-empty due to at least one callback permitting lazy callback processing being present.

16. A computer program product in accordance with claim 15, wherein said detecting comprises detecting an actual OOM condition based on an operating system notification.

17. A computer program product in accordance with claim 16, wherein said detecting comprises detecting a potential OOM condition based on a backlog of pending callbacks.

18. A computer program product in accordance with claim 16, wherein said at least one callback permitting lazy callback processing comprises either any callback or any lazy callback.

19. A computer program product in accordance with claim 16, wherein said performing comprises enqueuing a non-lazy callback on each RCU callback list having said at least one callback permitting lazy callback processing.

20. A computer program product in accordance with claim 16, wherein said performing comprises setting a non-lazy mode wherein all pending callbacks are treated as non-lazy.

21. A computer program product in accordance with claim 20, wherein said performing comprises processing said RCU callback lists until either each affected callback list is emptied or is reduced to a predetermined size.

* * * * *